ic control system for use with a continuously
United States Patent
Shellman et al.

[11] 3,789,703
[45] Feb. 5, 1974

[54] HYDRAULIC CONTROL SYSTEM

[75] Inventors: Carl E. Shellman, Livonia; Nils P. Week, Allen Park, both of Mich.

[73] Assignee: General Motors Corporation, Detroit, Mich.

[22] Filed: Oct. 2, 1972

[21] Appl. No.: 294,085

[52] U.S. Cl. .................................. 74/860, 74/864
[51] Int. Cl. ............................................ B60k 21/00
[58] Field of Search ...................................... 74/860

[56] References Cited
UNITED STATES PATENTS
2,875,635   3/1959   Fleck et al. ......................... 74/860
FOREIGN PATENTS OR APPLICATIONS
933,643   8/1963   Great Britain ........................ 74/860

Primary Examiner—Arthur I. McKeon
Attorney, Agent, or Firm—John P. Moran

[57] ABSTRACT

The drawings illustrate an improved, simplified hydraulic control system for use with a continuously variable drive ratio transmission, the system being responsive to engine governor pressure and engine vacuum to provide constant speed or part-throttle operation and full-throttle operation, the latter producing results comparable to the speed rise curve obtained in a transmission embodying a hydrokinetic torque converter.

7 Claims, 2 Drawing Figures

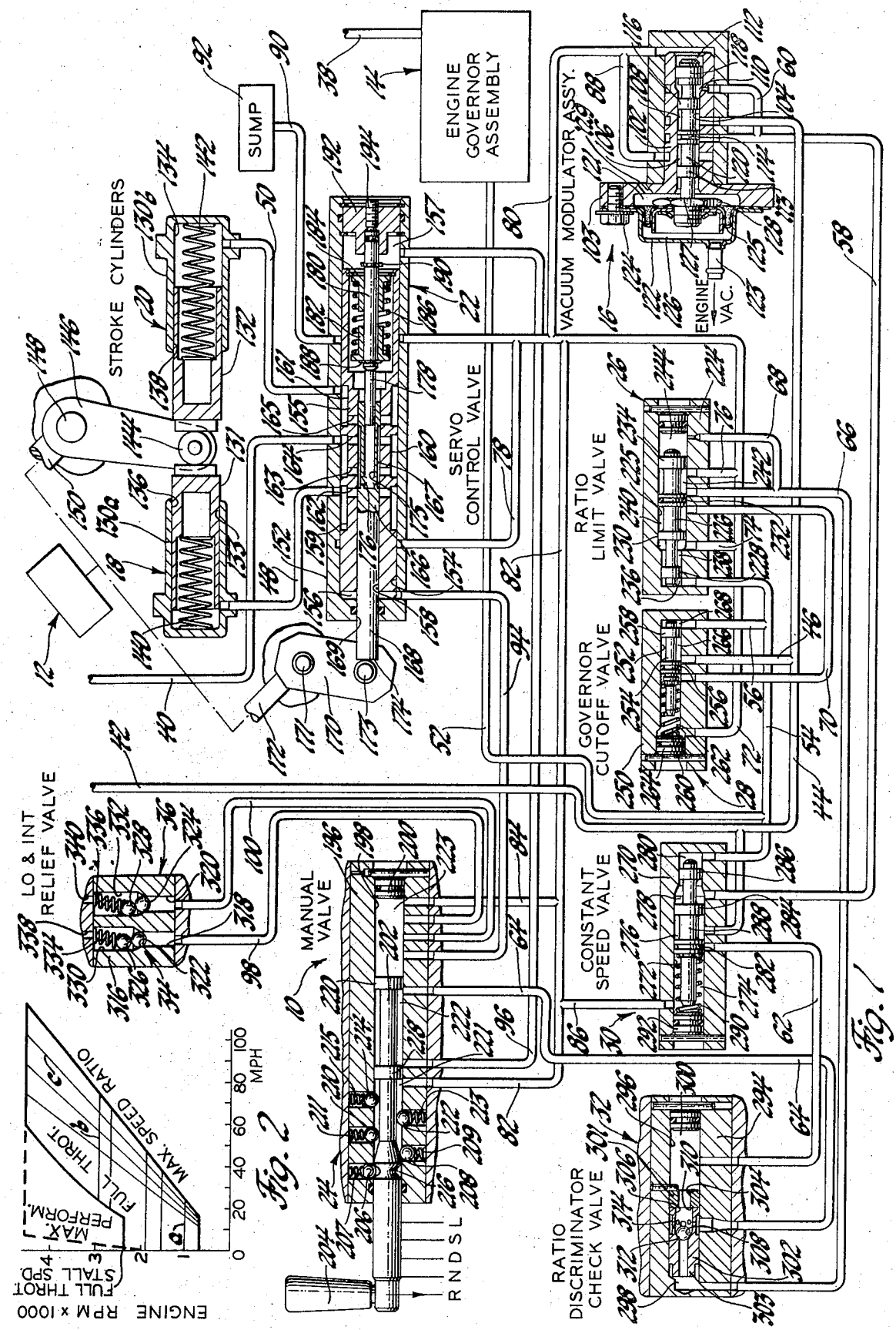

3,789,703

HYDRAULIC CONTROL SYSTEM

This invention relates generally to hydraulic continuously systems and, more particularly, to hydraulic control systems for use with a device having continuously variable ratio positions.

It is desirable for use with a constiuously variable drive ratio position device, such as a "toric" or traction-drive roller and race-type transmission, or the swash plate-type pump of a hydrostatic transmission, to have a hydraulic control system whose control parameters are engine speed and engine vacuum, with provisions for controlling the rate of engine acceleration vs. MPH to minimize objectionable engine noise while providing maximum tractive drive comparable in operation to the effect of a hydrokinetic torque converter.

Accordingly, an object of the invention is to provide an improved hydraulic control system adapted to operate in response to hydraulic signals indicative of engine speed and engine vacuum.

Another object of the invention is to provide an improved hydraulic control system embodying engine governor pressure and engine vacuum to provide two modes of operation, i.e., constant speed and full throttle operation.

Still another object of the invention is to provide an improved hydraulic control system wherein: (1) during part-throttle operation, for each throttle opening there is a corresponding speed and vacuum condition in response to which the control system varies the ratio position of the controlled device; and (2) for full-throttle operation where the speed called for exceeds a predetermined value, say, 2,400 rpm, the control system provides a stall speed of 2,400 rpm, with engine speed thereabove being caused to follow a curve which is similar to the speed rise curve of a hydrokinetic torque converter in order to avoid objectionable engine noise.

A further object of the invention is to provide an improved hydraulic control system wherein a first valve arrangement provides fluid pressure indicative of constant speed to the ratio control device by establishing a pressure corresponding to each speed and vacuum condition, and a second valve arrangement is responsive to engine speed only to overrule the first valve arrangement under full-throttle operation above a predetermined engine speed, say, 2,400 rpm.

These and other objects and advantages of the invention will be apparent when reference is made to the following description and accompanying drawings, wherein:

FIG. 1 is a schematic illustration of a hydraulic control system embodying the invention; and FIG. 2 is a graphic representation of operating characteristics of the invention.

Referring now to the drawings in greater detail, the Figure illustrates a hydraulic control system 10 including any device having continuously variable ratio positions, such as a traction-drive mechanism, or a swash plate-type pump for a hydrostatic transmission, such device being represented generally at 12; an engine-driven governor assembly, represented generally at 14 and being similar to the governor assembly 216 of U.S. Pat. No. 3,574,289 Scheiter et al, and capable of producing a 95 psi fluid pressure signal at approximately 4000 engine rpm; a vacuum modulator assembly 16; forward and reverse stroke cylinders 18 and 20, respectively; a servo control valve 22; a manual valve 24; a ratio limit valve 26; a governor cut-off valve 28; a constant speed valve 30; a ratio discriminator check valve 32; and low and intermediate relief valves 34 and 36, respectively.

Insofar as the hydraulic circuit is concerned, the pump embodied in the device 12 provides a predetermined line pressure of, say, 100 psi, to lines 38, 40, and 42 leading, respectively, to the governor assembly 14, the servo control valve 22, and to a line 44 which communicates line pressure from the line 42 to the vacuum modulator assembly 16, the constant speed valve 30, and a branchline 46 leading to the governor cut-off valve 28. Lines 48 and 50 communicate between the servo control valve 22 and the forward and reverse stroke cylinders 18 and 20, respectively.

A line 52 communicates governor pressure between the governor assembly 14 and a line 54 which, in turn, communicates with the constant speed valve 30, the ratio limit valve 26, and a branchline 56 leading to the governor cut-off valve 28.

A line 58 and an interconnecting branchline 60 communicate modulated pressure from the vacuum modulator assembly 16 to the constant speed valve 30. A line 62 communicates pressure indicative of constant speed between the constant speed valve 30 and the ratio discriminator check valve 32; and lines 64 and 66 communicate ratio pressure from the ratio discriminator check valve 32 to the manual valve 24 and a midportion of the ratio limit valve 26, respectively. A branchline 68 connects between the line 66 and an end portion of the ratio limit valve 26. A line 70 communicates limit feed pressure between the ratio limit valve 26 and the governor cut-off valve 28.

A central exhaust line 72 communicates between the governor cut-off valve 28 and the servo control valve 22, with exhaust branchlines 74 and 76 leading from the exhaust line 72 to the ratio limit valve 26, an exhaust branchline 78 leading from the exhaust line 72 to another portion of the servo control valve 22, an exhaust branchline 80 leading from the line 72 to an end portion of the vacuum modulator assembly 16, and another exhaust branchline 82 leading from the exhaust line 72 to the manual valve 24. Further exhaust branchlines 84 and 86 lead from the exhaust branchline 82 to an end portion of the manual valve 24 and to the constant speed valve 30; and still another exhaust branchline 88 leads from the exhaust branchline 80 to a midportion of the vacuum modulator assembly 16. An additional exhaust line 90 leads from the servo control valve 22, where it communicates with the central exhaust line 72, to a sump 92.

Lines 94 and 96 communicate respective forward and reverse ratio pressure between the manual valve 24 and the servo control valve 22, while lines 98 and 100 communicate the forward ratio pressure between the manual valve 24 and the low and intermediate relief valves 34 and 36, respectively.

VACUUM MODULATOR ASSEMBLY

The assembly 16 includes a housing 102 having an end flange 103, a central bore 104 which is divided into chambers 106, 108, 110 and 112 by lands 113, 114, 116 and 118 formed on a spool valve 120 slidably mounted in the bore 104. The end flange 103 is counterbored to form a chamber 121 with the adjacent face of the land 113. An end cover 122, including an inlet fitting 123, is secured to the face of the flange 103 by bolts 124 so as to secure the outer edge of a diaphragm 125 therebetween, the latter separating chamber 121 from a chamber 126 within the cover 122. The end face 127 of the valve 120 abuts against a solid member 128 secured to the diaphragm 125. Line pressure from the line 44 is communicated to the chamber 108 and modulated by land 114 to enter line 58 in response to engine vacuum which enters the chamber 126 via the inlet fitting 123. Chambers 106 and 112 communicate with exhaust lines 88 and 80, respectively. The chamber 121 is vented to atmosphere through an opening 129.

STROKE CYLINDERS

The forward and reverse stroke cylinders 18 and 20 include respective housings 130a and 130b having respective pistons 131 and 132 slidably mounted in respective bores or central chambers 133 and 134. The pistons 131 and 132 extend through openings 136 and 138 formed in the inner ends of the forward and reverse stroke cylinders 18 and 20, respectively. Springs 140 and 142 urge the respective pistons 131 and 132 out through the respective openings 136 and 138 and into contact with opposite sides of a pin or roller 144 mounted on one end of a lever 146 which is pivotally mounted at its other end on a pivot pin 148. An arm 150 is mounted at one end thereof for rotation with the lever 146 and is operatively connected at its other end to the pump 12. The drive ratio position, both for forward and reverse operation, is determined by the respective axial movements of the forward and reverse pistons 131 and 132, respectively. Lines 48 and 50 communicate respectively with the central chambers 133 and 134.

SERVO CONTROL VALVE

The servo control valve 22 includes a housing 152 having a central bore 154 formed therein in which a valve sleeve 155 is slidably mounted intermediate end chambers 156 and 157. The sleeve 155 includes a central passage 158, annular grooves 159, 160, and 161, radial ports 162 from the passage 158 to the groove 159, adjacent radial ports 163 and 164 from the passage 158 to the groove 160, and radial ports 165 from the passage 158 to the groove 161. A servo valve 166 is slidably mounted in the central passage 158 of the sleeve 155. An annular groove 167 is formed on the servo valve 166, providing regulated pressure from the line 40 for either forward or reverse operation depending upon the axial position of the valve 166 with respect to the respective radial ports 162 and 165 and the forward and reverse feedlines 48 and 50. A stem 168 extends from the valve 166 through an opening 169 formed in an end of the housing 152. A lever 170 is pivotally mounted at one end thereof on a pivot pin 171 and is rotated about the pin 171 in response to rotary movement of the lever 146 via the arm 150 and an interconnected arm 172. A pin or roller 173 is formed on the free end of the lever 170 so as to contact the end face 174 of the stem 168. The servo control valve 22 further includes an axial passage 175 formed in the valve 166. Radial ports 176 communicate between the axial passage 175 and the chamber formed by the annular groove 167. A retracting pin 178 is slidably mounted in the axial passage 175 and is contacted at its outer end by a servo valve stop pin 180 which is slidably mounted through spool members 182 and 184, the latter being urged apart by a spring 186. Retainer rings 188 and 190 are mounted at predetermined points on the pin 180 adjacent the outer ends of the respective spool members 182 and 184. The end of the stop pin 180 which extends away from the pin 178 is slidably mounted in an end plug 192 secured to the housing 152. A threaded end portion 194 is formed on the stop pin 180 and threadedly mounted in the end plug 192 for adjustment purposes.

MANUAL VALVE

The manual valve 24 includes a housing 196 having a central bore 198 formed therein, there being a plug 200 closing one end of the bore 198, with a selector valve stem 202 extending into the other end of the housing 196. A manual lever 204 is secured at the outer end of the valve stem 202. REVERSE ("63 R"), NEUTRAL ("N"), DRIVE ("D"), INTERMEDIATE ("S"), and LOW ("L") drive ratio indicia are formed adjacent the exposed portion of the valve stem 202, the manual lever 204 being selectively aligned therewith. Five (5) retention balls 206, 208, 210, 212, and 214 are respectively urged by springs 207, 209, 211, 213, and 215 into a groove 216 formed on the valve stem 202, depending upon the drive ratio position of the selector lever 204. A pair of lands 218 and 220 formed on the valve stem 202 divide the bore 198 into chambers 221, 222, and 223, and serve to direct ratio pressure from the line 64 into either the forward or reverse lines 94 and 96, respectively, depending upon the axial position of the lands 218 and 220.

RATIO DISCRIMINATOR CHECK VALVE

The ratio discriminator check valve 32 includes a housing 294 having a central passage 296 formed therein including opposite end chambers 298 and 300. The ratio limit and constant speed lines 66 and 62, respectively, communicate with respective chambers 298 and 300. A two-piece sleeve member 301 and 302 is secured at an intermediate location in central passage 296. An axial passage 304 is formed through the sleeve member 301. The axial passage 303 is enlarged at an intermediate chamber portion 306 thereof to form oppositely disposed valve seats 308 and 310 with respect to axial passages 303 and 304. A ball valve 312 is mounted in the portion 306 for alternate cooperation with the valve seats 308 and 310. Radial passages 314 are formed in the sleeve member 302 to provide communication between the chamber 306 and the line 64 leading to the manual valve assembly 24.

CONSTANT SPEED VALVE

The constant speed valve 30 includes a housing 270 having a bore 272 formed therein and divided into chambers 274, 276, 278, and 280 by lands 282, 284, and 286 formed on a valve member 288 which is slidably mounted in the bore 272. A spring 290 is mounted in the chamber 274 between the end wall 292 of the housing 270 and the adjacent face of the land 282. Line pressure entering the chamber 276 from the line 44 is modulated past the land 282 into the line 62 in response to the combined effect on the valve 288 of governor pressure entering the chamber 280 from the line 54 and of modulated pressure entering the chamber 278 from the vacuum modulator 16 via the line 58, against the force of the spring 290. The resultant constant speed pressure in the line 62 indicative of speed and vacuum conditions indicative of particular throttle openings.

GOVERNOR CUT-OFF VALVE

The governor cut-off valve 28 includes a housing 250 having a central bore 252 formed therein in which is mounted a valve 254 having lands 256 and 258 formed therein. A spring 260 is mounted in a chamber 262 of the bore 252 between an end wall 264 of the housing 250 and the adjacent face of the land 256. The exhaust line 72 communicates with the chamber 262. A chamber 266 is formed in the bore 252 between the lands 256 and 258, while an end chamber 268 is formed adjacent the outer surface of the land 258. Governed pressure is communicated to the end chamber 268 via the line 56, while line pressure is communicated to the chamber 266 via the mainline 42/44/46. Communication of line pressure past the land 256 into the limit feedline 70 is prevented by the force of the spring 260 on the valve 254 until the governor pressure in the chamber 268 is indicative of a predetermined engine speed, say, 2,400 rpm.

RATIO LIMIT VALVE

The ratio limit valve 26 includes a housing 224 having a central bore 225 formed therein. A regulating spool valve 226, having lands 228, 230, 232, and 234 formed thereon, is slidably mounted in the bore 225, dividing the latter into chambers 236, 238, 240, 242, and 244. The chamber 236 receives governor pressure from the line 52/54. The chamber 238 is exhausted via the line 74. The chamber 240 receives limit feed pressure from the line 70 and regulates same past the land 232 into the ratio limit line 66 in response to the effect of the governor pressure in the chamber 236 on the regulating valve 226 within a predetermined engine speed range, say, 2,400 to 4,000 rpm, as will be explained. The chamber 242 is exhausted via the line 76, and the chamber 244 is subjected to the regulated pressure from the line 66 via the branchline 68 for balancing the valve 226.

LOW AND INTERMEDIATE RELIEF VALVES

The low and intermediate relief valves 34 and 36 include a housing 316 having respective passages 318 and 320 formed therein communicating with the lines 98 and 100, respectively. Valve seats 322 and 324 are formed in the passages 318 and 320, respectively, with respective suitable ball valves 326 and 328 mounted adjacent thereto in chambers 330 and 332, respectively, and urged toward the seats 322 and 324 by springs 334 and 336, respectively. Exhaust ports 338 and 340 serve to exhaust the chambers 330 and 332, respectively, when the respective ball valves 326 and 328 are unseated.

OPERATION

It may be noted by referring to FIG. 1 that if the manual selector lever 204 is positioned in NEUTRAL ("N"), ratio pressure entering the central chamber 222 of the housing 196 intermediate the lands 218 and 220 will be blocked by said lands from communicating with either the reverse or forward feedlines 96 and 94, respectively, the chambers 221 and 223 being open to the exhaust lines 82 and 84, respectively. Hence, the spring 186 of the servo control valve assembly 22 will have returned the valve sleeve 155 to its neutral position by having urged the spool members 182 and 184 against the respective retainer rings 188 and 190, and the infinitely variable ratio device 12 is not actuated. The ports communicating with the exhaust lines 78 and 90 serve to exhaust any leakage past the respective forward and reverse end portions of the servo control valve sleeve 155 back to the sump 92.

Assume now that the operator has placed the selector lever 204 in the REVERSE ("R") position shown in the Figure, where it is retained by virtue of the ball 206 being urged into the annular slots or grooves 216 by the spring 207. The resultant leftward movement of the land 218 of the valve 202 from the abovementioned NEUTRAL position causes the fluid displaced from the bore 198 to the left of the land 218 to exhaust via the line 82. Ratio pressure entering the bore 198 from the line 64 is communicated to the reverse cylinder line 96 and thence to the chamber 157 of the servo control housing 152, moving the sleeve 155 to the left, against the force of the spring 186, as shown in the Figure. This permits line pressure from the line 40, the annular chamber 160, the radial ports 164, and the annular chamber 167 to be communicated past the right-hand edge of the annular groove 167, through the radial ports 165, the annular chamber 161, and the line 50 to the chamber 134 of the stroke cylinder 20, to move the piston 132 to the left, pivotting the lever 146 to set the desired ratio position for the device 12. As the new ratio position is being thus established, movement of the arm 150 is fed back to the arm 172, thereby pivotting the lever 170 and roller 173 to cause the stem 168 and, hence, the valve 166 to assume a balanced regulating position with the annular groove 167 being centered between the radial ports 162 and 165, until such time as signals indicative of engine speed and/or engine vacuum change, as will be explained.

Next, consider the placing of the manual lever 204 in DRIVE ("D") position, the spring-loaded ball 210 in the annular notch 216 serving to retain the valve stem 202 in such position. The resultant position of the lands 218 and 220 is such that ratio limit pressure from the line 64 is directed via the chamber 222 to the line 94 and, thence, to the chamber 156 of the servo control valve 22 to move the sleeve 155 to the right against the force of the spring 186, the spool member 184 being abutted against the retainer ring 190, to thus cause line pressure from the line 40 to be communicated via the annular groove 160, the ports 163, past the left-hand edge of the annular groove 167, to the ports 162 and the annular groove 159, thence to the forward feedline 48 to position the piston 131, the roller 144, the lever 146, and the arm 150 accordingly. This establishes the ratio pressure for the continuously variable device 12. Feedback through the arm 172, the lever 170, the roller 173, the stem 168, and the valve 166 positions the latter in a balanced regulating position, with the annular groove 167 thereof centered between the radial parts 162 and 165.

It should be noted at this point that any time the pin 173 tends to move away from the face 174 of the stem 168, the retracting pin 178 serves as a piston with respect to the fluid in the passage 175, to force the valve 166 leftwardly to follow the pin 173.

The ratio position of the device 12 is thereafter varied during part-throttle operation such that for each throttle opening there is a corresponding combined speed and vacuum condition signal directed to the servo control valve 22 and, thence, to the controlled device 12, the curve finally attained thereby being the "maximum speed ratio" curve illustrated in FIG. 2. Typically, part-throttle acceleration occurs at a constant or nearly constant engine speed, such as constant speed line "a" (FIG. 2), depending on throttle opening, until the maximum speed ratio curve is reached. Normally all steady-state road load operation will not be along the maximum speed ratio curve, comparable to a direct drive condition in a conventional geared transmission. Part-throttle acceleration, operation on grades, for example, can, of course, occur at any point between the full-throttle and ratio limit curves, for example, along constant speed line "a"(FIG. 2) until some speed ratio curve "c" is reached.

Specifically, this is accomplished by virtue of any change in governor pressure and/or in modulated pressure, as a result of engine speed changes from either a manually initiated change in the throttle setting or the encountering of nonlevel road conditions, being directed via the lines 52 and 58, respectively, to the respective chambers 280 and 278 of the constant speed valve assembly 30. The resultant combined effect on the faces of the lands 286 and 284, respectively, as opposed by the force of the spring 290, moves the valve 288 so as to modulate the line pressure communicated to the chamber 276 from the mainline 42/44 past the adjacent edge of the land 282 and into the line 62. Such modified constant speed pressure is thereupon communicated to the chambers 300 and 306 of the ratio discriminator check valve assembly 32 and, thence, via the ports 314, the line 64, the chamber 222 of the manual valve assembly 24, and the line 94 to the servo control valve assembly 22 for changing the ratio position of the device 12 accordingly.

It may be noted that during part-throttle operation the pressure in the chambers 300 and 306 of the ratio discriminator check valve assembly 32 is sufficient to retain the ball valve 312 on the seat 308 inasmuch as the pressure in the chamber 298 is influenced by changes in governor pressure only via the valve assemblies 28 and 26.

Consider now a full-throttle increase in speed. The immediate result is to eliminate any modulated vacuum effect on the constant speed valve chamber 278 on the face of the land 284, permitting the spring 290 to close off the constant speed line 62 from the main feedline 44. Concurrently, governor pressure in the lines 52, 54, and 56 is increased, causing the governor cut-off valve 254 to move to the left, against the force of the spring 260, increasing the effect of line pressure from the line 46 on the limit feed pressure in the line 70. The governor signal from the line 54 in the left end chamber 236 of the ratio limit valve 226 moves the latter to the right, permitting the increased limit feed pressure from the line 70 to be communicated past the land 232, to the ratio limit line 66. The valve 226 seeks a new position, balanced by the changed governor pressure on the left end thereof and the changed ratio limit pressure on the right end thereof.

The resultant ratio limit pressure is communicated via the line 66 to the left end of the ratio discriminator check valve housing 294 and, hence, to the ball valve 312 which is now readily moved off the seat 308 and across the chamber 306 to the seat 310.

The above-described increased ratio limit pressure in the chamber 298 is thus communicated through the radial ports 314 to the line 64, and thence to the bore 198 of the manual valve assembly 24 intermediate the lands 218 and 220 and via the line 94 to the chamber 156 of the servo control valve assembly 22 to thereby cause a change in the ratio position for the device 12 along the "full-throttle" curve shown in FIG. 2, rather than along the "maximum performance" line which would have been the full-throttle result without the influence of the valve assemblies 26 and 28. The noise element of a rapid rise in engine speed along the "maximum performance" line would be highly objectionable.

Should the manual lever 204 be placed on INTERMEDIATE "S,"33 or LOW "L," it may be noted that the land 220 would be positioned to the right of the lines 100 and 98, respectively, with the respective intermediate and low relief valves 328 and 326 limiting the pressure in the forward cylinder line 94 and, hence, in the chamber 156 of the servo control valve assembly 22 to respective predetermined lower pressures, say, 63 and 36 psi, resulting in steeper linear curves to the left of the "direct drive" curve of FIG. 2.

It should be apparent that the invention provides a simplified hydraulic control system wherein an infinitely variable drive ratio is accomplished in an efficient, smooth and acoustically acceptable manner, under both part-throttle and full-throttle conditions, for use with continuously variable transmissions, such as a hydrostatic transmission or a "toric" transmission.

It should also be apparent that a suitable spool valve arrangement could be utilized in lieu of the low and intermediate relief or "blow-off" valves 34 and 36.

While but one embodiment of the invention has been shown and described, other modifications thereof are possible.

We claim:

1. For use with an infinitely variable device, a hydraulic control system comprising a source of fluid under pressure, an engine governor assembly for providing a fluid signal indicative of engine speed, a vacuum modulator assembly for providing a fluid signal indicative of engine vacuum, servo control means for selectively moving said infinitely variable device to establish the ratio position thereof, constant speed valve means for receiving said fluid signals indicative of engine speed and engine vacuum from said respective engine governor and vacuum modulator assemblies and varying the pressure of said fluid under pressure to correspond to said speed and vacuum conditions under part-throttle conditions to provide a ratio fluid signal, valve limiting means for receiving said fluid signal indicative of engine speed above a predetermined engine speed under full-throttle conditions to provide a full-throttle fluid signal, and manual valve means for receiving said ratio fluid signal under said part-throttle conditions and for receiving said full-throttle fluid signal under said full-throttle conditions and directing same to said servo control means.

2. For use with an infinitely variable device a hydraulic control system comprising a source of fluid under pressure, an engine governor assembly for providing a fluid signal indicative of engine speed, a vacuum modulator assembly for providing a fluid signal indicative of engine vacuum, servo control means for selectively moving said infinitely variable device to establish the ratio position thereof, constant speed valve means for receiving said fluid signals indicative of engine speed and engine vacuum from said respective engine governor and vacuum modulator assemblies and varying the pressure of said fluid under pressure to correspond to said speed and vacuum conditions during part-throttle operation, valve limiting means for receiving said fluid signal indicative of engine speed and providing a regulated fluid pressure signal for overruling said constant speed valve means above a predetermined engine speed during full-throttle operation, and manual valve means for receiving said varied pressure signal during said part-throttle operation and for receiving said regulated fluid pressure signal during said full-throttle operation and selectively directing same to said servo control means.

3. The hydraulic control system described in claim 2, wherein said servo control means includes forward and reverse feed control valve means for moving said infinitely variable device into forward or reverse operating position, and forward and reverse feedlines communicating said fluid signal from said manual valve means to one of said forward and reverse feed control valve means depending upon the selected position of said manual valve means.

4. The hydraulic control system described in claim 2, and low and intermediate relief valves operatively connected to said manual valve means to limit the pressure of the fluid signal being directed by said manual valve means to said servo control means upon the selective manual positioning of said manual valve means.

5. For use with an infinitely variable device, a hydraulic control system comprising a source of fluid under pressure, an engine governor assembly for providing a fluid signal indicative of engine speed, a vacuum modulator assembly for providing a fluid signal indicative of engine vacuum, servo control means for selectively moving said infinitely variable device into forward or reverse operating position and establishing the ratio position thereof, constant speed valve means for receiving said fluid signals indicative of engine speed and engine vacuum from said respective engine governor and vacuum modulator assemblies and varying the pressure of said fluid under pressure to correspond to said speed and vacuum conditions to provide maximum speed ratio operation, valve limiting means for receiving said fluid signal indicative of engine speed and varying the pressure of said fluid under pressure to provide a regulated fluid pressure signal for overruling said constant speed valve means above a predetermined engine speed under full-throttle conditions to provide full-throttle curve operation, check valve means for receiving said varied pressure signal from said constant speed valve means and said regulated fluid pressure signal from said valve limiting means and permitting only the higher pressure one of said two signals to pass therethrough, and manual valve means for receiving one of said varied pressure signals and said regulated fluid pressure signal from said check valve means and selectively directing same via forward or reverse feedlines to said servo control means.

6. For use with an infinitely variable device, a hydraulic control system comprising a source of fluid under pressure, an engine governor assembly for providing a fluid signal indicative of engine speed, a vacuum modulator assembly for providing a fluid signal indicative of engine vacuum, servo control means for selectively moving said infinitely variable device into forward or reverse operating position and establishing the ratio position thereof, constant speed valve means for receiving said fluid signals indicative of engine speed and engine vacuum from said respective engine governor and vacuum modulator assemblies and varying the pressure of said fluid under pressure to correspond to said speed and vacuum conditions to provide maximum speed ratio operation, valve limiting means for receiving said fluid signal indicative of engine speed and varying the pressure of said fluid under pressure to provide a regulated fluid pressure signal above a predetermined engine speed to provide full-throttle operation, ratio discriminator check valve means for receiving said varied pressure signal from said constant speed valve means and said regulated fluid pressure signal from said valve limiting means and transmitting said varied pressure signal during part-throttle conditions and said regulated fluid pressure signal during full-throttle conditions, and manual valve means for receiving said transmitted varied pressure signal or regulated fluid pressure signal from said check valve means and selectively directing same via forward or reverse feedlines to said servo control means.

7. For use with an infinitely variable device, a hydraulic control system comprising a source of fluid under pressure, an engine governor assembly for providing a fluid signal indicative of engine speed, a vacuum modulator assembly for providing a fluid signal indicative of engine vacuum, servo control means for selectively moving said infinitely variable device into forward or reverse operating position and establishing the ratio position thereof, constant speed valve means for receiving said fluid signals indicative of engine speed and engine vacuum from said respective engine governor and vacuum modulator assemblies and varying the pressure of said fluid under pressure to correspond to said speed and vacuum conditions to provide a fluid signal for maximum speed ratio curve operation, governor cut-off valve means for receiving said fluid signal indicative of engine speed and responding to said signal when said signal is indicative of a speed higher than a predetermined engine speed and varying the pressure of said fluid under pressure to provide a fluid signal corresponding thereto, ratio limit valve means for receiving both said varied pressure signal from said governor cut-off means and said fluid signal indicative of engine speed and providing a regulated fluid signal for full-throttle curve operation, check valve means for receiving said varied pressure signal from said constant speed valve means and said regulated fluid pressure signal from said ratio limit valve means and permitting only the higher pressure one of said two signals to pass therethrough, and manual valve means for receiving one of said varied pressure signal and said regulated fluid pressure signal from said check valve means and selectively directing same via forward or reverse feedlines to said servo control means.

* * * * *